United States Patent
Boening et al.

(10) Patent No.: US 9,133,857 B2
(45) Date of Patent: Sep. 15, 2015

(54) TURBOCHARGER HOUSING AND TOOL DEVICE FOR MACHINING THE TURBOCHARGER HOUSING

(75) Inventors: Ralf Boening, Reiffelbach (DE); Holger Faeth, Fussgoenheim (DE); Udo Schwerdel, Gerolsheim (DE); Christian Uhlig, Worms (DE)

(73) Assignee: Continental Automotive GmbH, Hannover (DE)

( * ) Notice: Subject to any disclaimer, the term of this patent is extended or adjusted under 35 U.S.C. 154(b) by 150 days.

(21) Appl. No.: 13/509,633

(22) PCT Filed: Nov. 11, 2010

(86) PCT No.: PCT/EP2010/067290
§ 371 (c)(1),
(2), (4) Date: May 14, 2012

(87) PCT Pub. No.: WO2011/058101
PCT Pub. Date: May 19, 2011

(65) Prior Publication Data
US 2012/0288367 A1 Nov. 15, 2012

(30) Foreign Application Priority Data
Nov. 13, 2009 (DE) .......................... 10 2009 053 106

(51) Int. Cl.
*F02B 33/44* (2006.01)
*F02D 23/00* (2006.01)
*F04B 17/00* (2006.01)
(Continued)

(52) U.S. Cl.
CPC ............ *F04D 29/4206* (2013.01); *F01D 25/14* (2013.01); *F01D 25/26* (2013.01); *F02C 6/12* (2013.01); *F02C 7/20* (2013.01); *F04D 25/024* (2013.01); *F04D 29/624* (2013.01); *F05D 2220/40* (2013.01); *F05D 2230/53* (2013.01); *Y10T 29/54* (2015.01); *Y10T 407/20* (2015.01)

(58) Field of Classification Search
CPC .............. F01D 25/14; F02C 6/12; F02C 7/20; F05D 2220/40
USPC ..................... 60/598, 605.3, 605.1, 602, 624; 123/559.1–559.3, 65 BA; 415/229; 417/407
See application file for complete search history.

(56) References Cited

U.S. PATENT DOCUMENTS 3,077,189 A * 2/1963 Earnshaw et al. ........ 123/65 BA
4,432,205 A 2/1984 Inoue et al.
(Continued)

FOREIGN PATENT DOCUMENTS

CN 1109184 C 5/2003
CN 101568736 A 10/2009
(Continued)

OTHER PUBLICATIONS

Espacenet Machine Translation (English) of JP2006063851.*
(Continued)

*Primary Examiner* — Thai Ba Trieu
*Assistant Examiner* — Deming Wan
(74) *Attorney, Agent, or Firm* — Laurence A. Greenberg; Werner H. Stemer; Ralph E. Locher

(57) ABSTRACT

A turbocharger has a housing with at least one section that is divided in the longitudinal direction into at least two housing halves.

10 Claims, 4 Drawing Sheets

(51) Int. Cl.
*F04B 35/00* (2006.01)
*F01D 25/00* (2006.01)
*F01D 25/16* (2006.01)
*F03B 11/06* (2006.01)
*F03B 11/00* (2006.01)
*F03D 11/00* (2006.01)
*F04D 29/42* (2006.01)
*F01D 25/14* (2006.01)
*F01D 25/26* (2006.01)
*F02C 6/12* (2006.01)
*F02C 7/20* (2006.01)
*F04D 29/62* (2006.01)
*F04D 25/02* (2006.01)

(56) References Cited

U.S. PATENT DOCUMENTS

| | | | | |
|---|---|---|---|---|
| 4,474,007 | A * | 10/1984 | Kronogard et al. | 60/605.1 |
| 4,541,786 | A | 9/1985 | McLean | |
| 4,674,284 | A * | 6/1987 | Kronogard et al. | 60/624 |
| 4,786,238 | A * | 11/1988 | Glaser et al. | 417/53 |
| 5,102,305 | A | 4/1992 | Bescoby et al. | |
| 5,310,311 | A * | 5/1994 | Andres et al. | 415/229 |
| 6,354,083 | B1 | 3/2002 | Shuttleworth et al. | |
| 6,425,743 | B1 * | 7/2002 | Fischer | 417/407 |
| 6,572,351 | B2 * | 6/2003 | Durand et al. | 418/9 |
| 7,832,938 | B2 | 11/2010 | McKeirnan, Jr. | |
| 2006/0045735 | A1 | 3/2006 | Holdik et al. | |
| 2009/0000118 | A1 * | 1/2009 | Squires | 29/888.01 |
| 2012/0257966 | A1 * | 10/2012 | Boening et al. | 415/229 |
| 2012/0269620 | A1 * | 10/2012 | Boening et al. | 415/203 |
| 2012/0269624 | A1 * | 10/2012 | Boening et al. | 415/229 |
| 2012/0321455 | A1 * | 12/2012 | Boening et al. | 415/208.1 |

FOREIGN PATENT DOCUMENTS

| | | | | |
|---|---|---|---|---|
| DE | 407 141 C | 12/1924 | | |
| DE | 407141 A1 | 12/1924 | | |
| DE | 975 375 C | 11/1961 | | |
| DE | 975375 C | 11/1961 | | |
| DE | 40 21 325 C1 | 1/1992 | | |
| DE | 197 58 642 C2 | 7/2002 | | |
| DE | 102004042127 A1 | 3/2006 | | |
| DE | 10 2007 017 854 A1 | 10/2008 | | |
| DE | 102010013706 A1 * | 10/2011 | | F01D 25/24 |
| DE | 102010013697 B4 * | 4/2014 | | F01D 25/24 |
| GB | 2 248 278 A | 4/1992 | | |
| JP | 57052624 A * | 3/1982 | | F02B 37/00 |
| JP | 59141721 A | 8/1984 | | |
| JP | 2006063851 | * | 3/2006 | |
| WO | 2008125553 A1 | 10/2008 | | |

OTHER PUBLICATIONS

STIC English Translation of Japanese Patent JP57-52624 A, Senzaki et al, Mar. 29, 1982.*

* cited by examiner

TURBOCHARGER HOUSING AND TOOL DEVICE FOR MACHINING THE TURBOCHARGER HOUSING

BACKGROUND OF THE INVENTION

Field of the Invention

The invention relates to a turbocharger housing, the turbocharger housing having at least one or two rotor housings, for example a compressor housing and a turbine housing, and a bearing housing. Furthermore, the invention relates to a tool device for machining the turbocharger housing.

In general, turbochargers serve to improve the degree of efficiency of an internal combustion engine and therefore to increase its performance. To this end, the turbocharger has a turbine with a turbine rotor and a compressor with a compressor rotor, the two rotors being arranged on a common shaft. Here, the turbine rotor is driven via an exhaust gas mass flow of a connected internal combustion engine and in turn drives the compressor rotor. Here, the compressor compresses the air which is taken in and guides it to the internal combustion engine. Here, the shaft is mounted in a bearing housing of the turbocharger. Furthermore, the turbine rotor of the turbine is arranged in a turbine housing and the compressor rotor of the compressor is arranged in a compressor housing.

A turbocharger of this type has a very wide variety of requirements to meet during operation on the internal combustion engine or a connected engine. One of said requirements is to absorb the high temperatures which occur and can be produced, for example, on account of the hot exhaust gas mass flow in the turbocharger housing.

Here, the customary construction of the turbocharger provides individual housings, with a material which is adapted in each case to the temperature which prevails there. Here, the compressor housing is usually made from aluminum, whereas the bearing housing is made from gray cast iron, it additionally being possible for the bearing housing to also be of water-cooled configuration. The turbine housing is in turn generally made from materials with a high nickel proportion, on account of the high temperatures which prevail in this region. On account of the adapted, different materials for the individual housings, said housings are configured as separate parts which have to be connected to one another and, moreover, have to be sealed in the process with respect to one another. A turbocharger of this type is therefore complicated to produce and assemble.

BRIEF SUMMARY OF THE INVENTION

Accordingly, it is the object of the present invention to provide an improved turbocharger housing.

This object is achieved by the turbocharger housing described herein.

Accordingly, in accordance with the invention, a turbocharger housing is provided which is configured such that it is divided at least partially or completely in the longitudinal direction into at least two housing halves, that section of the turbocharger housing which is divided in the longitudinal direction having a compressor housing, a bearing housing and/or a turbine housing. Here, the turbocharger housing can be produced, for example, from aluminum or an aluminum alloy or from another metal or metal alloy, or from another suitable material.

Here, the turbocharger housing has the advantage that the running gear, that is to say the rotors on the shaft and the bearing arrangement of the shaft, can be preassembled and subsequently can be inserted as a complete unit into the housing halves. Furthermore, the running gear can previously be subjected to operational balancing, without having to be assembled in advance in the turbocharger housing.

Furthermore, a tool device is provided for machining the turbocharger housing which is divided at least partially or completely in the longitudinal direction, the tool device having at least one or more tool elements for machining at least one section of the turbocharger housing which is divided in the longitudinal direction.

Advantageous refinements and developments of the invention result from the subclaims and the description with reference to the drawings.

In the following text, the invention will be explained in greater detail using the exemplary embodiments which are specified in the diagrammatic figures of the drawing, in which:

DESCRIPTION OF THE INVENTION

In all the figures, identical or functionally identical elements and apparatuses have been provided with the same designations, as long as nothing else is specified. Furthermore, the illustration of the turbocharger in the following figures is shown purely diagrammatically, not to scale and in a greatly simplified manner.

Figure 1:
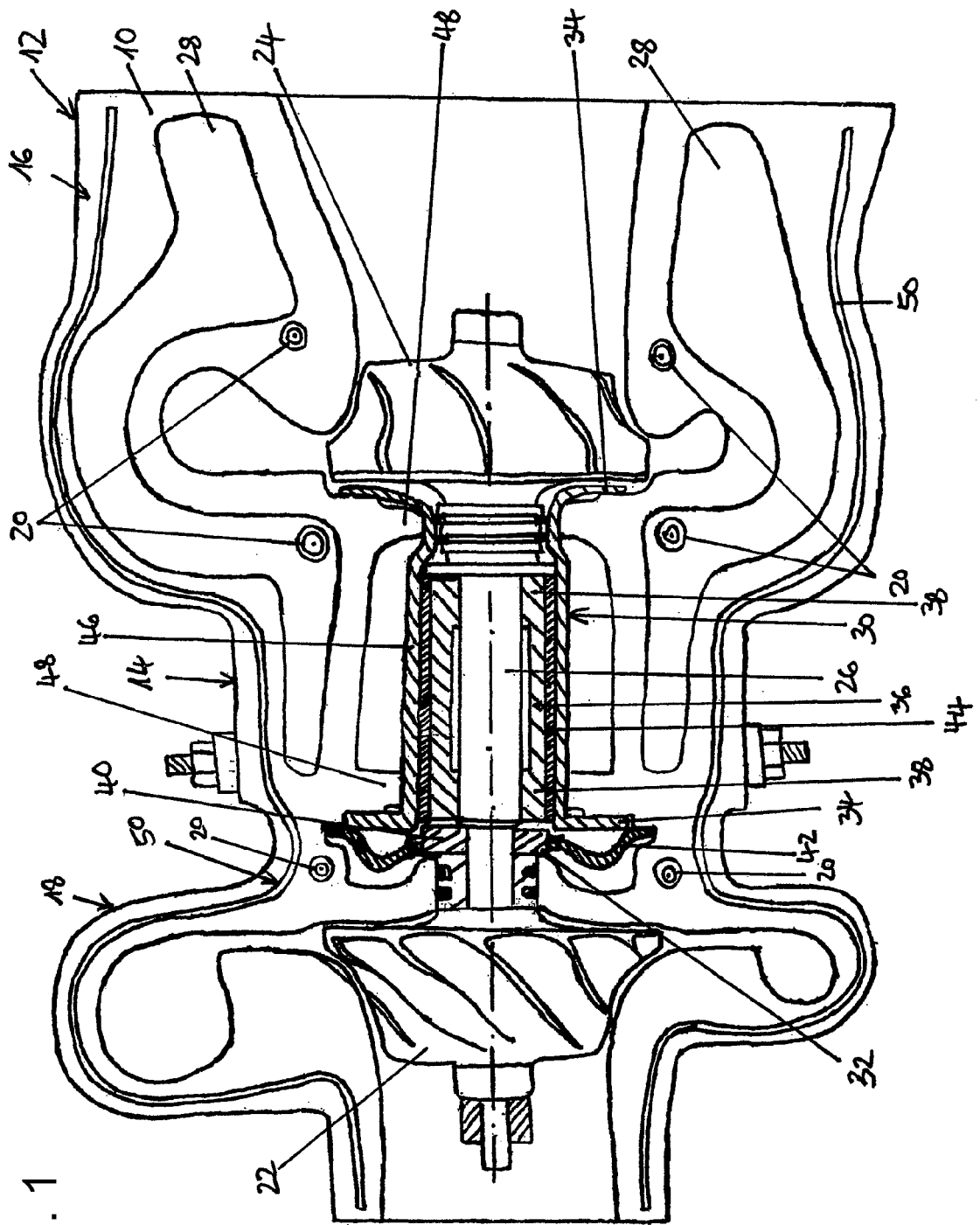
FIG. 1 shows a sectional view of a housing half of a turbocharger housing according to a first embodiment of the invention, as viewed from the gasket side.

FIG. 1 shows a sectional view through a housing half 10 of a turbocharger housing 12 according to a first embodiment of the invention, the housing half 10 being shown here from the gasket side. The gasket device for sealing the two housing halves 10 will be explained in yet further detail with reference to FIG. 2. FIG. 1 shows, by way of example, a cutout 50 or groove for receiving a gasket device.

In the present example here, the turbocharger housing 12 has a bearing housing 14, a turbine housing 16 and a compressor housing 18, all three housings being combined to form one housing 12, for example. In the case which is shown, the invention consists of, for example, first of all combining all three housings 14, 16, 18 theoretically and producing them as one part or, for example, casting them in one piece. In order to mount the rotor or rotors and to machine the inner functional faces, a division is defined, furthermore, by way of which the interior of the housing 12 can be opened.

According to the invention, this division takes place in the longitudinal direction, for example in the horizontal or a horizontal plane or in a plane at a different angle with respect to the horizontal plane. In the following FIGS. 3 and 4, examples of various division planes in the longitudinal direction of the turbocharger housing are shown in greater detail. In principle, the entire turbocharger housing 12, consisting of the compressor housing 18, the turbine housing 16 and the bearing housing 14, can be configured such that it is divided in the longitudinal direction. However, it is also possible for only a section of the turbocharger housing 12 to be of divided configuration in the longitudinal direction, the section comprising, for example, a rotor housing 16, 18 and/or the bearing housing 14.

As is shown in FIG. 1, the turbine housing 16, the bearing housing 14 and the compressor housing 18 can be formed from at least two or more housing halves 10 in each case in one piece. In the present case in FIG. 1, the turbocharger housing 12 is divided in the horizontal into two housing halves 10. Here, a first housing half 10, consisting, for example, of the turbine housing 16, the bearing housing 14 and the compressor housing 18, forms what is known as the upper part, and a second housing half, consisting of the turbine housing 16, the bearing housing 18 and the compressor housing 14, forms what is known as the lower part. Here, FIG. 1 shows a housing half 10 from the gasket side. Here, said housing half 10 is fastened, for example screwed, to the other housing half (not shown). To this end, in the embodiment which is shown in FIG. 1, at least one or more holes 20, for example six holes here, are provided, for example, for screwing the two housing halves to one another. In principle, however, every other form of fastening of the housing halves can also be provided. Screwing represents merely one example.

The division in the longitudinal direction, the horizontal or substantially horizontal division in the present example, results first of all in direct advantages. For instance, automated preassembly of the running gear is possible, including the two rotors, such as the compressor rotor 22 and the turbine rotor 24, and the shaft 26. Here, the subsequent mounting in the turbocharger is simplified considerably. Furthermore, if additional temperature control, for example cooling and/or heating, of at least one part of the turbocharger housing 12 is provided, for example of the turbine housing 16, the bearing housing 14 and/or the compressor housing 12, a fluid or temperature control jacket 28 with a fluid core can be provided. In the example in FIG. 1, said fluid jacket 28 envelops, for example, the bearing housing section 14 and the turbine housing section 16 of the turbocharger housing 12 without undercuts, since, in the present example, the turbine housing 16 and the bearing housing 14 are additionally to be cooled, for example. In this case, for example, a sand core for producing the fluid jacket 28 does not have to be assembled from a plurality of pieces and adhesively bonded.

It is a further advantage that at least one half or the entire turbocharger housing 12 can be integrated into the engine block and/or cylinder head of a connected engine. Here, for example, the lower part of the turbocharger housing 12 can be integrated into the engine block and the upper part can be integrated into the cylinder head, or else vice versa.

In FIG. 1, the shaft 26, on which the turbine rotor 24 and the compressor rotor 22 are provided, is mounted in the bearing housing section 14 of the turbocharger housing 12. Here, the turbine rotor 24 is arranged in the turbine housing section 16 and the compressor rotor 22 is arranged in the compressor housing section 18. Furthermore, the shaft 26 has a radial bearing arrangement 30 and, optionally in addition, an axial bearing arrangement 32.

In the turbocharger according to the invention which forms, for example, two hole halves as a result of the division, the bearing arrangement 30 is installed in an axially clamped manner, for example, via resiliently acting collar sections 34.

In FIG. 1, the shaft 26 is mounted via the radial bearing arrangement 30 and the axial bearing arrangement 32. Here, the radial bearing arrangement 30 has, for example, a continuous sleeve 36 which forms in each case one sliding bearing section 38 at its two ends, for mounting the shaft 26 in the radial direction. Here, the sleeve 36 is pushed onto the shaft 26, the shaft 26 forming, for example, a shoulder with a stop for the sleeve 36. An axial bearing arrangement 32 is provided at the other end of the sleeve 36, the axial bearing arrangement 32 having at least one axial bearing, for example in the form of an axial bearing plate 40. An oil diverting plate 42 can optionally be arranged additionally on the axial bearing plate 40. Furthermore, a ply 44 comprising at least one or more layers of heat-resistant or temperature-resistant, elastic material, such as a polymer, an elastomer and/or a hard rubber, to name only a few examples, can optionally be arranged additionally on the outer side of the sleeve 36.

Moreover, a sleeve element 46 is provided on the outer side of the ply 44 made from the elastic, temperature-resistant material. Here, the sleeve element 46 is made, for example, from metal, e.g. steel. As an alternative, the elastic, temperature-resistant material can also be omitted and, instead, the sleeve element 46 can be provided directly on the outer side of the sleeve 36 (not shown) or optionally the sleeve 36 can be configured in such a way that it acts not only as a radial bearing arrangement 30, but also as a sleeve element 46 (not shown).

In the example which is shown in FIG. 1, the sleeve element 46 has in each case one collar section 34 at its two ends. Here, for example, at least one or both collar sections 34 of the sleeve element 46 are of resilient configuration, in order to be clamped between two stops or receptacles 48 or projections of the turbocharger housing 12 in this case. One or both collar sections 34 can likewise be of non-resilient or rigid configuration and can be inserted between the two receptacles 48, and can optionally be fastened to the receptacles 48 additionally by way of screws on one or both sides. At least one of the collar sections 34 of resilient configuration can likewise optionally be fastened to the respective receptacle 48 additionally by means of screwing, for example. Here, one or both collar sections 34 are connected, for example, integrally to the sleeve element 46 or are fastened to the latter as a separate part (not shown). The bearing arrangement 30, in this case the radial bearing arrangement 30 consisting of the sleeve 36, and the elastic ply 44, is fixed or clamped in the axial direction in the turbocharger housing 12 or the two housing halves 10 of the turbocharger housing 12 via the two collar sections 34 of the sleeve element 46.

Here, moreover, at least one collar section 34 can optionally additionally be guided out of the oil space, as in FIG. 1 on the turbine side, for example, and can assume further functions, such as that of a heat shield. However, one or both collar sections 34 can also remain within the oil space, such as the collar section 34 of the sleeve element 46 on the compressor side. Furthermore, a bearing arrangement 30 of this type has the advantage that it can be completely preassembled per se and can therefore be balanced operationally, for example, without the surrounding housings.

In FIG. 1, the radial bearing arrangement 30 and axial bearing arrangement 32 are merely one example of mounting of the shaft 26 in the radial and axial directions. In principle, the shaft 26 in the turbocharger housing 12 according to the invention can have any other radial bearing arrangement and/or or axial bearing arrangement. For instance, the sleeve 36 can also be replaced, for example, by two radial sliding bearings (not shown), the two sliding bearings for example optionally having additionally a spacer sleeve or the sleeve element 46 having, on its inner side, in each case one receptacle for one or both sliding bearings (not shown). In addition to sliding bearings, contactless bearings, such as magnetic bearings, and antifriction bearings can also be provided for radial and/or axial mounting. The invention is not restricted to the examples which are shown and described for bearing arrangements.

Figure 2:
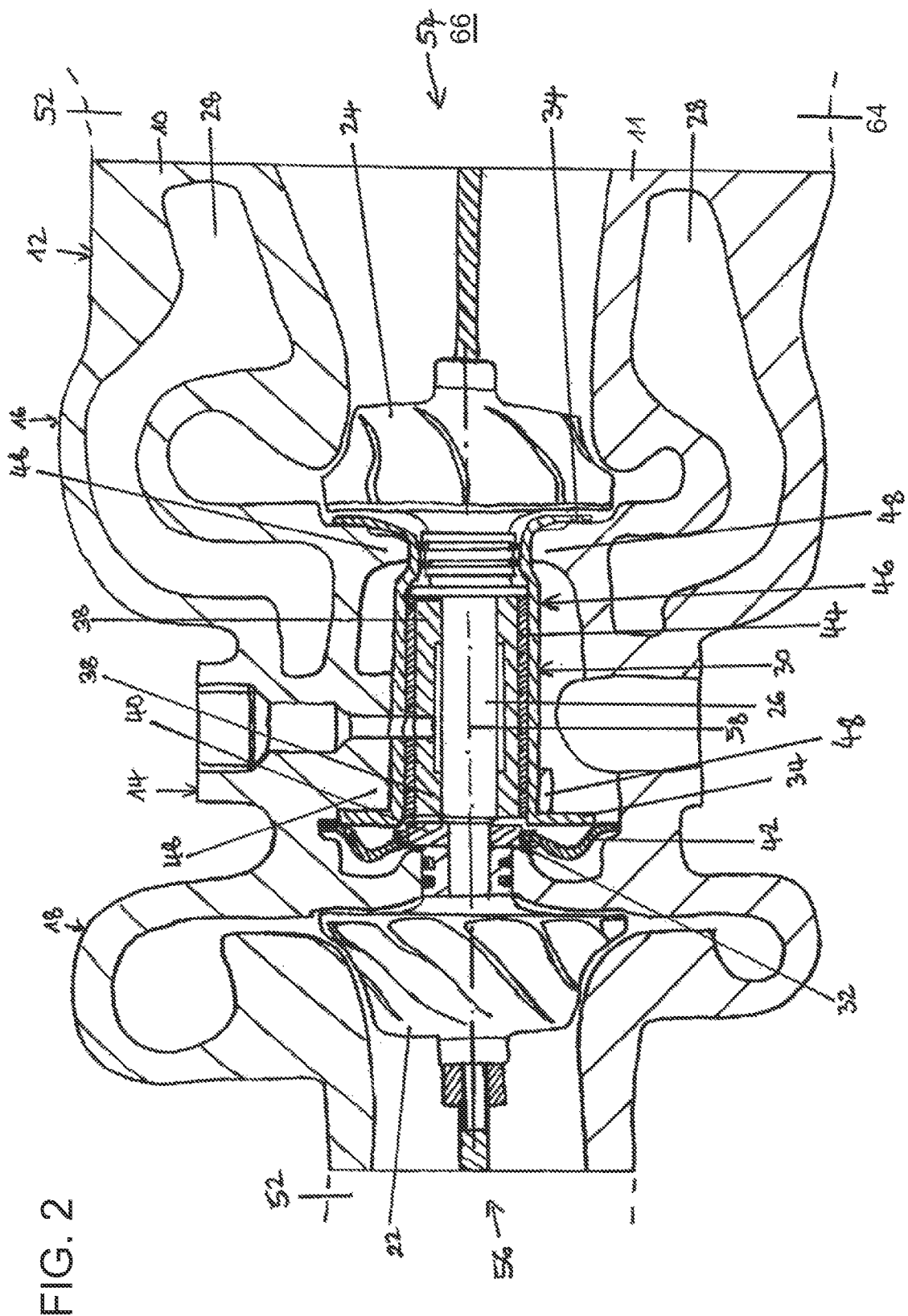
FIG. 2 shows a sectional view of a turbocharger housing according to the first embodiment of the invention, the first and second housing halves of the turbocharger housing being shown in the sectional view.

FIG. 2 shows a further sectional view of a turbocharger housing 12 according to the invention, the first and second housing halves 10, 11 of the turbocharger housing 12 being shown in the sectional view. As described previously, the two first and second housing halves 10, 11 of the turbocharger housing 12 are fastened to one another, for example by screwing, after the installation of the rotors 22, 24 and the shaft 26 with the radial bearing arrangement 30 and/or axial bearing arrangement 32. Here, moreover, the two housing halves 10, 11 are sealed with respect to one another. Here, the gasket device which is provided for sealing the two housing halves 10, 11 can have, for example, a bead gasket which is inserted into grooves or cutouts of one or both housing halves 10, 11, the remaining, non-sealed housing half faces then being in direct contact, for example. One embodiment of a cutout or groove 50 of this type is shown by way of example in FIG. 1. As an alternative or in addition, the gasket device can also have at least one O-ring and/or at least one elastomer for relatively cold regions, such as the compressor housing section 18, and a bead gasket for warmer regions, for example the bearing housing section 14 and, in particular, the turbine housing section 16. Moreover, the sealing of the two housing halves 10, 11 forms the core of a dedicated patent application.

As is indicated, moreover, in a greatly simplified manner in FIG. 2, the turbocharger can be configured both as a separate part and, in particular, as part of a cylinder head 64 (as is indicated in FIG. 2 by a dashed line) of a connected internal combustion engine 66 and/or as part of an engine block 52 of the internal combustion engine 66 (as is indicated in FIG. 2 by a dashed line). For example, the first housing half 10 of the turbocharger housing 12 can be integrated at least partially into an engine block 52 (as is indicated in FIG. 2 by a dashed line) of the internal combustion engine 66, and the second housing half 11 of the turbocharger housing 12 can be integrated at least partially into a cylinder head 64 (as is indicated in FIG. 2 by a dashed line) of the internal combustion engine 66.

Here, for example, the outlet for the exhaust gas mass flow of the cylinder head can be connected or configured directly to/with the inlet of the turbine and/or the outlet for the compressed air of the compressor can be connected or configured directly to/with the inlet for the compressed air of the cylinder head (not shown).

However, the turbocharger or a part of the turbocharger not only can be integrated into the cylinder head, but rather, optionally in addition or as an alternative, a part or substantially the entire turbocharger can be integrated into the engine block 52 of the connected internal combustion engine.

For example, the turbine inlet 54 can be connected to the outlet for the exhaust gas mass flow of the internal combustion engine or its engine block 52, or can be integrated into it, and/or the outlet 56 for the compressed air of the compressor can be connected to the inlet for the compressed air on the internal combustion engine or its engine block 52, or can be integrated into it.

Furthermore, for example, the lower housing half of the turbocharger housing 12 with the oil outlet for collecting the lubricating oil from the bearing arrangement can be integrated into the engine block of the connected internal combustion engine. As an alternative or in addition, the upper housing half of the turbocharger housing can be integrated into the cylinder head. In principle, a discrete turbocharger with, for example, an upper and a lower housing half can also be provided. Similarly, in one embodiment according to the invention, only, for example, the lower housing half of the turbocharger can be integrated into the engine block or, in a further embodiment according to the invention, only the upper housing half of the turbocharger can be integrated into the cylinder head. Furthermore, in another embodiment according to the invention, the lower housing half of the turbocharger can be integrated into the engine block and the upper housing half of the turbocharger can be integrated into the cylinder head. However, the invention is not restricted to these examples for the partial or complete integration of the turbocharger.

Figure 3:
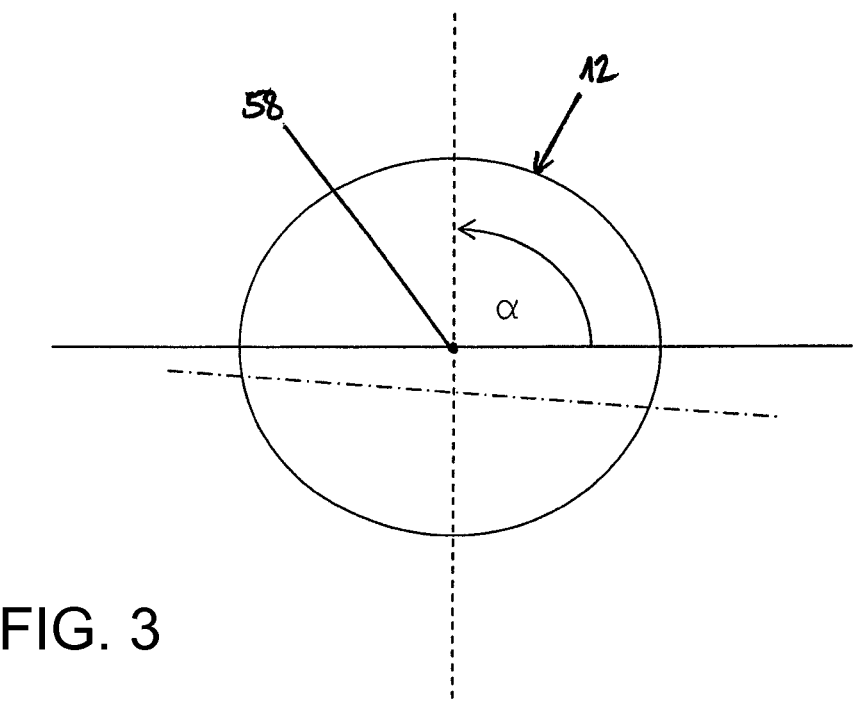
FIG. 3 shows a diagrammatic front view for possible sectional planes of the turbocharger housing according to the invention.

FIG. 3 shows a greatly simplified and purely diagrammatic front view of the turbocharger housing 12 for possible sectional planes of the turbocharger housing according to the invention. As is shown in FIG. 3, the turbocharger housing 12, consisting of the turbine housing, the bearing housing and/or the compressor housing, is configured so as to be divided in the longitudinal direction in contrast to the previous turbocharger housings. The previous turbocharger housings are divided in the transverse direction or in a plane perpendicularly with respect to a horizontal plane, and in the process are divided into a compressor housing, a bearing housing and a turbine housing. Here, in the prior art, the housings are positioned in a row next to one another in the longitudinal direction for assembly.

As is shown in FIG. 3, the turbocharger housing 12 can be divided in the longitudinal direction once in the horizontal or a horizontal plane. Here, the horizontal dividing plane is indicated by a continuous line. As an alternative, the turbocharger housing 12 can also be divided in the longitudinal direction in the vertical, as is indicated in FIG. 3 by a dashed line. The turbocharger housing 12 can likewise be divided at a different angle $\alpha$ in a range between 0° and 360°. Furthermore, the dividing plane does not necessarily have to extend through the center axis or longitudinal axis 58 of the turbocharger housing 12, but rather can also extend in an offset manner with respect to said axis, as is indicated in FIG. 3 by a dash-dotted line.

Figure 4:
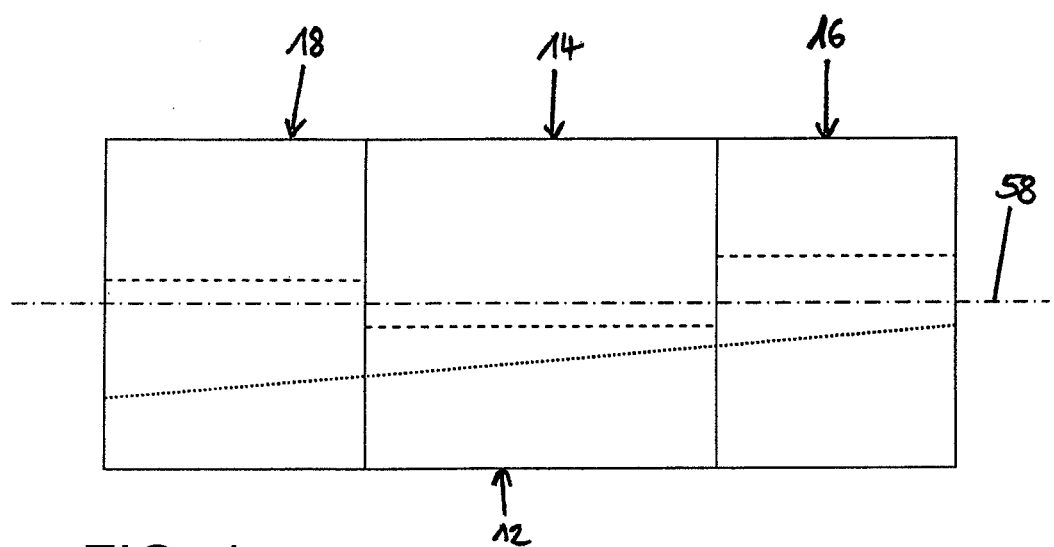
FIG. 4 shows a diagrammatic side view for possible sectional planes of the turbocharger housing according to the invention.

Furthermore, FIG. 4 shows a greatly simplified and purely diagrammatic side view for possible sectional planes of the turbocharger housing 12 according to the invention. Here, the turbocharger housing 12 consists of a compressor housing 18, a bearing housing 14 and a turbine housing 16, and is divided, for example, into two halves 10, 11, a first housing half 10 and a second housing half 11. As is shown in FIG. 4, the turbocharger housing 12 can be configured so as to be divided in the longitudinal direction along its longitudinal axis 58, horizontally or in a horizontal plane. Here, the longitudinal axis 58 is illustrated as a dash-dotted line. Furthermore, the turbocharger housing 12 can also be divided in the longitudinal direction in a stepped manner, in, for example, a horizontal or other plane, as is indicated in FIG. 4 by a dashed line. Here, for example, the compressor housing 18 is divided in a, for example, horizontal plane above the longitudinal axis 58. Furthermore, the bearing housing 14 is in turn divided in a, for example, horizontal plane below the longitudinal axis 58, and the turbine housing 16 is divided in, for example, a horizontal plane above the dividing plane of the compressor housing 18. As an alternative, the turbocharger housing 12 can also be divided in the longitudinal direction in a plane obliquely with respect to a horizontal plane, as is indicated by a dotted line.

In principle, the turbocharger housing 12, that is to say the compressor housing 18, the bearing housing 14 and/or the turbine housing 16, can be configured such that it is divided in at least one or more arbitrary planes into at least two or more halves in the longitudinal direction.

Figure 5:
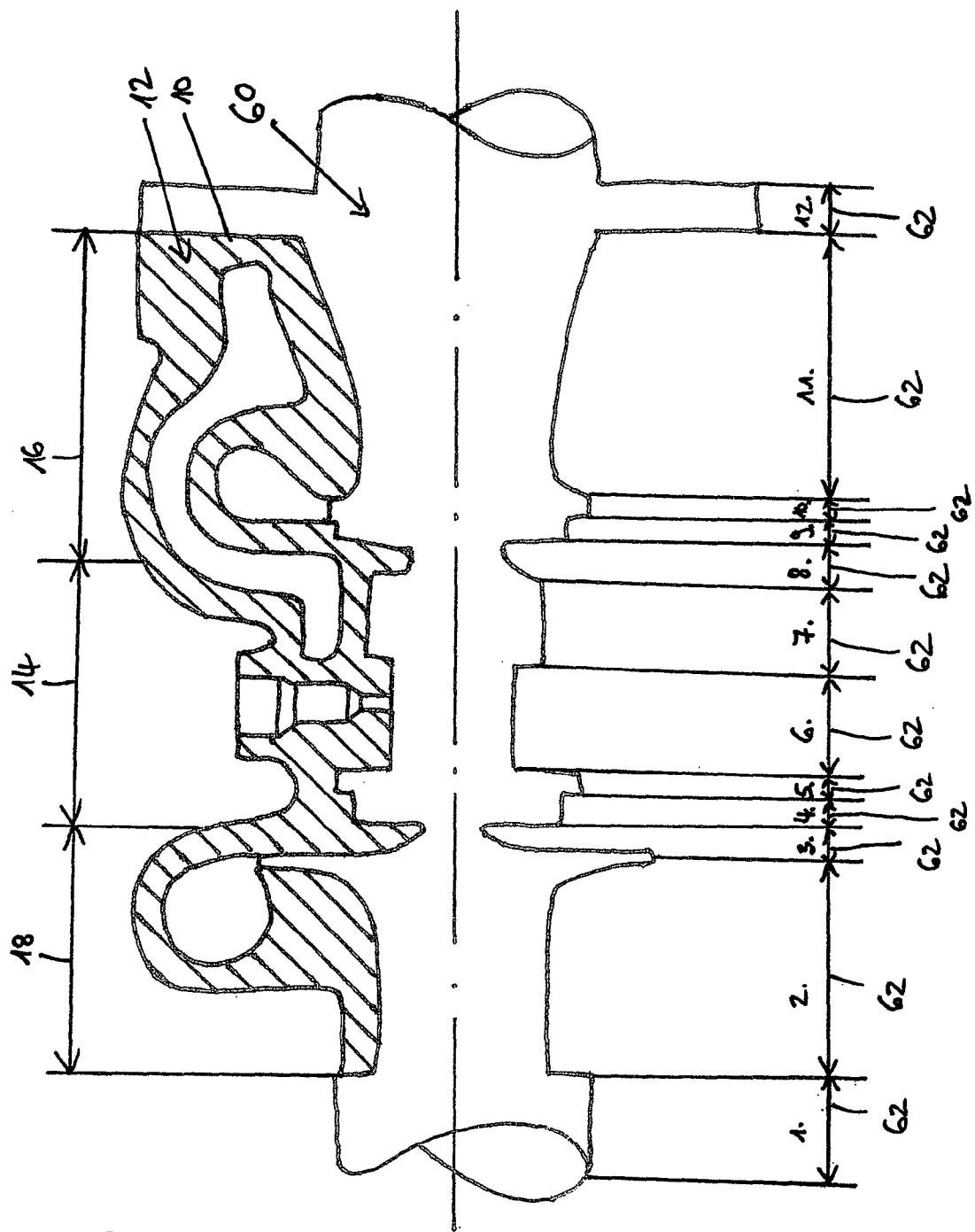
FIG. 5 shows a sectional view of an upper housing half of a turbocharger housing according to the invention and a machining device for machining the turbocharger housing according to the invention.

Furthermore, FIG. 5 shows an upper part or an upper housing half 10 of a turbocharger housing 12 according to the invention and a tool device 60 for machining the upper part 10 and lower part, from which the turbocharger housing 12 is assembled. Here, the lower part or the lower housing half of the turbocharger housing 12 is not shown for reasons of clarity.

In order to ensure the versatile functionality of the turbocharger, narrow tolerances and therefore precise machining of the components of the turbocharger are necessary. In the previous turbochargers with conventional cast housings for the turbine, the compressor and the mounting of the shaft, various machining steps are necessary; among them, turning operations and milling operations are carried out.

According to the invention, machining which is as simple as possible of the functional faces of the turbocharger is then achieved, as a result of rotationally symmetrical machining of the housing halves 10 of the turbocharger housing 12. Here, the rotationally symmetrical machining of the turbocharger housing halves 10, in the present case of the upper part and the lower part or the first and second housing halves 10 of the turbocharger housing 12, of an integrally cast turbocharger is carried out in a tool device 60, for example a cylindrical cutter device as is shown in FIG. 5. Here, at least one or preferably both housing halves 10 is/are, as it were, reverse drawn during the machining process of a cylindrical cutter device 60. The technological advantage consists of the fact that all axial dimensions of the rotationally symmetrical machining are achieved by the shape of the cylindrical cutter device 60. That is to say, the axial tolerances between any desired faces always end up identical. Additive tolerance chains over a plurality of components do not occur, as is the case in the conventional design of turbocharger housings.

In the example which is shown in FIG. 5, a turbocharger housing 12 which is divided in the longitudinal direction is produced, only the tool device 60 according to the invention and the first housing half 10 of the two housing halves of the turbocharger housing 12 according to the invention being shown. The second housing half of the turbocharger housing 12 has not been shown for reasons of clarity. Here, the tool device 60 according to the invention is of rotationally symmetrical or completely rotationally symmetrical configuration, for example in the form of at least one, two or a multiplicity of cylindrical cutter elements 62 which are preferably combined to form a cylindrical cutter device 60.

In the present case which is shown in FIG. 5, the cylindrical cutter device 60 consists, for example, of a first and second cylindrical cutter element 62 for milling the outer side and the inner contour of the compressor housing section 18. Furthermore, a third, fourth, fifth, sixth and seventh cylindrical cutter element 62 are provided for milling individual sections of the bearing housing section 14. Furthermore, an eighth, ninth, tenth, eleventh and twelfth cylindrical cutter element 62 are provided for milling the inner contour and the outer side of the turbine housing section 16.

The division of the cylindrical cutter element 62 can take place in any desired manner, depending on sections to be milled of the turbocharger housing 12. Here, sections on the cylindrical cutter device 60 between cylindrical cutter elements 62 can be left free or not fitted with a cylindrical cutter element 62 if a section of the turbocharger housing 12 is not to be machined with a cylindrical cutter 62, in comparison with other sections of the turbocharger housing 12. Furthermore, the above-described cylindrical cutter elements 62 can be combined in any desired manner to form a cylindrical cutter element 62, or a cylindrical cutter element 62 can be divided into two and more cylindrical cutter elements 62, depending on the function and intended use. The invention is not restricted to the cylindrical cutter device 60 as tool device, as is shown in FIG. 5, but rather the cylindrical cutter device 60 can be configured in any desired manner, depending on the turbocharger housing 12 to be machined. Furthermore, a cylindrical cutter device 60 can be provided for milling the compressor housing 18, the bearing housing 14 and/or the turbine housing 16.

In addition or as an alternative to the cylindrical cutter elements 62, one or more turning elements (not shown) can also be provided, or other machining elements, for machining the turbocharger housing.

Although the present invention has been described using preferred exemplary embodiments, it is not restricted thereto, but rather can be modified in a wide variety of ways. The abovementioned embodiments, in particular individual features thereof, can be combined with one another.

The invention claimed is:

1. A machine, comprising:
an internal combustion engine having an outlet for providing an exhaust gas mass flow and an inlet for receiving compressed air; and
a turbocharger housing including at least one housing section divided in a longitudinal direction thereof into at least two housing halves;
said turbocharger housing formed with a turbine inlet connected to said outlet of said internal combustion engine and a compressor outlet connected to said inlet of said internal combustion engine;
wherein said at least two housing halves include a first housing half and a second housing half, and wherein said first housing half of the turbocharger housing is integrated at least partially into an engine block of the combustion engine, and said second housing half of the turbocharger housing is integrated at least partially into a cylinder head of the internal combustion engine.

2. The machine according to claim 1, wherein the turbocharger housing is divided in the longitudinal direction in a horizontal plane.

3. The machine according to claim 1, wherein the turbocharger housing is divided in the longitudinal direction in at least one plane that encloses an angle between 0° and 360° relative to a horizontal plane of the turbocharger housing.

4. The machine according to claim 1, wherein said two housing halves of the turbocharger housing are connected to one another.

5. The machine according to claim 1, wherein said two housing halves of the turbocharger housing are sealingly connected to one another.

6. The machine according to claim 5, which comprises at least one sealing device selected from the group consisting of a bead gasket, an O-ring gasket, and an elastomer gasket disposed between said two housing halves.

7. The machine according to claim 1, wherein the turbocharger housing is formed with at least one or two receptacles for receiving a sleeve element of a bearing arrangement for mounting a shaft of a turbocharger in the turbocharger housing.

8. The machine according to claim 7, wherein said sleeve element is configured for fastening to at least one or both said receptacles by screwing and/or axial clamping between said two receptacles in each case via one collar section at the two ends of said sleeve element.

9. The machine according to claim 1, wherein the turbocharger housing includes at least one rotor housing and one bearing housing.

10. The machine according to claim 9, wherein the turbocharger housing includes a compressor housing, a bearing housing, and a turbine housing.

\* \* \* \* \*